United States Patent [19]
Ayres et al.

[11] 3,792,874
[45] Feb. 19, 1974

[54] OCCUPANT RESTRAINT SYSTEM
[75] Inventors: John A. Ayres; Philip R. Peterson, both of Flint; John R. Ziegler, Flushing, all of Mich.
[73] Assignee: General Motors Corporation, Detroit, Mich.
[22] Filed: Feb. 11, 1972
[21] Appl. No.: 225,536

[52] U.S. Cl. .......... 280/150 AB, 180/91, 200/61.44
[51] Int. Cl. ............................................ B60r 21/10
[58] Field of Search ........ 180/91, 103; 280/150 AB; 200/61.44, DIG. 10; 293/2, 4, 86; 73/517 R

[56] References Cited
UNITED STATES PATENTS

| | | | |
|---|---|---|---|
| 3,654,412 | 4/1972 | Haruna et al. | 180/91 X |
| 2,944,804 | 7/1960 | Persson et al. | 73/517 R X |
| 3,146,014 | 8/1964 | Kroell | 293/86 X |
| 1,207,126 | 12/1916 | Benson | 200/DIG. 10 |
| 1,682,134 | 8/1928 | Lifschutz | 200/61.44 |
| 2,931,665 | 4/1960 | Sandor | 280/150 AB |
| 3,495,675 | 2/1970 | Hass et al. | 180/91 |
| 3,474,680 | 10/1969 | Babson et al. | 73/517 R |

Primary Examiner—David Schonberg
Assistant Examiner—Leslie J. Paperner
Attorney, Agent, or Firm—Herbert Furman

[57] ABSTRACT
A vehicle includes an energy absorbing bumper system having an impact bar supported by a spaced pair of like energy absorbing struts. The struts absorb the energy of impact forces applied to the impact bar up to a predetermined limit. An electromagnetic impact transducer includes a pair of telescopically related cylindrical members, one having one end connected to the frame of the vehicle and the other having one end connected to the impact bar. The one member includes cylindrical housing adjacent the other end receiving an induction coil and plastic bobbin assembly which is axially aligned with the other member. The plastic bobbin includes an integral inner radial rib which locates a permanent magnet within the bobbin a predetermined distance or dead zone from the other end of the other telescopic member. A coil compression spring seats between the magnet and the one end of the one member to hold the magnet in engagement with the rib. When the impact forces applied to the impact bar exceed the energy absorption limit of the struts, the other member moves through the dead zone and into engagement with the magnet to displace the magnet out of the coil and bobbin assembly against the seating spring and thereby induce a voltage in the coil which is proportional to the velocity of the magnet and its initial position. The output voltage of the coil triggers an electronic latch which initiates inflation of an inflatable occupant restraint cushion. The cushion is mounted within the passenger compartment and communicated with a pressure fluid source when a diaphragm is ruptured by electrically fired detonators. The predetermined distance or dead zones provides that no actuation of the transducer will occur unless the impact bar has moved a predetermined distance relative to the frame of the vehicle to permit low level impacts of the vehicle with an obstacle without inflation of the cushion.

4 Claims, 3 Drawing Figures

PATENTED FEB 19 1974 3,792,874

OCCUPANT RESTRAINT SYSTEM

This invention relates generally to occupant restraint systems and more particularly to such a system which includes an electromagnetic impact transducer for initiating inflation of an inflatable occupant restraint cushion when impact forces applied to the energy absorbing bumper system of the vehicle exceed the absorption limit thereof.

Conventional inflatable occupant restraint systems include a source of pressure fluid which is communicable upon signal with an inflatable occupant restraint cushion to inflate the cushion within the passenger compartment of the vehicle. The pressure fluid source may be communicated with the cushion in various ways, such as rupture of a pressure vessel diaphragm by electrically fired detonators, by electrical ignition of the igniters of a gas generator, or both rupture of a diaphragm and electrical ignition of an air-augmented system.

It is known to mount vehicle bumpers or impact bars on the vehicle by energy absorbing struts which absorb the energy of impact forces applied to the impact bar up to a predetermined limit. When this limit is exceeded, vehicle deformation will result. Such struts may include variable volume chambers divided by a movable piston having an aperture therethrough providing for flow of the displaceable medium from one chamber to the other to absorb impact forces applied to the impact bar. The rate of flow of the displaceable medium is controlled by a metering pin received within the piston orifice.

It is also known to measure the pressure of the medium in the one chamber upon movement of the piston within such chamber under impact forces and to initiate inflation of an air cushion when the pressure reaches a predetermined upper limit indicating that the struts cannot absorb the force.

This invention provides a system which includes an electromagnetic transducer for measuring the relative rate of movement of a pair of telescopically related members and provides an electrical signal through electromagnetic induction when a predetermined rate occurs. The transducer permits movement of the telescopic members through a predetermined distance or dead zone relative to each other before any signal can be generated to thereby provide for the absorption by the energy absorbing struts of impact forces up to their limit.

In the preferred embodiment of the invention, the pair of telescopic members are respectively connected to the impact bar or bumper of the vehicle and to the frame. The one member secured to the frame includes a coil and bobbin assembly which is coaxial with the one member and with the other member. The bobbin includes a fixed stop which locates a permanent magnet within the coil against the action of a biasing spring. This also positions the magnet a predetermined distance or dead zone from the unconnected end of the other member. When the impact forces applied to the impact bar are within the energy absorbing capability of the struts, the other member moves relative to the permanent magnet but does not move the magnet relative to the coil. Accordingly, no voltage is induced in the coil. When the impact forces exceed the energy absorbing capability of the struts, the other member engages the magnet to move the magnet out of the coil. This induces a voltage in the coil which is proportional to the rate of movement of the magnet and the rate of movement of the impact bar relative to the frame of the vehicle and indicative of the impact forces exceeding the energy absorbing capability of the struts. An electronic latch is triggered by the output voltage of the coil to initiate inflation of the cushion. The latch is not triggered unless the output voltage of the coil indicates that the magnet has moved relative to the coil at least at the predetermined rate.

It is therefore the primary object of this invention to provide an occupant restraint system including an electromagnetic impact transducer for measuring the velocity between an impact bar and a vehicle resulting from impact forces applied to the bar and initiating inflation of an inflatable occupant restraint cushion prior to vehicle deformation resulting from the impact forces exceeding the limit of energy absorption of an energy absorbing bumper system mounting the impact bar on the vehicle. It is another object of this invention to provide such a system wherein the transducer includes a pair of telescopically related members, one of the members mounting a fixed coil and a movable magnet, the other of the members being engageable with the magnet upon movement of the impact bar relative to the vehicle to move the magnet relative to the coil and induce a voltage in the coil proportional to the rate of movement of the magnet. It is a further object of this invention to provide such a system wherein the magnet is located in a predetermined position within the coil and spaced a predetermined distance from the other member to provide a dead zone permitting movement of the impact bar relative to the vehicle through a predetermined distance under impact forces without inflation of the cushion.

These and other objects of the invention will be readily apparent from the following specification and drawings wherein.

Figure 1:
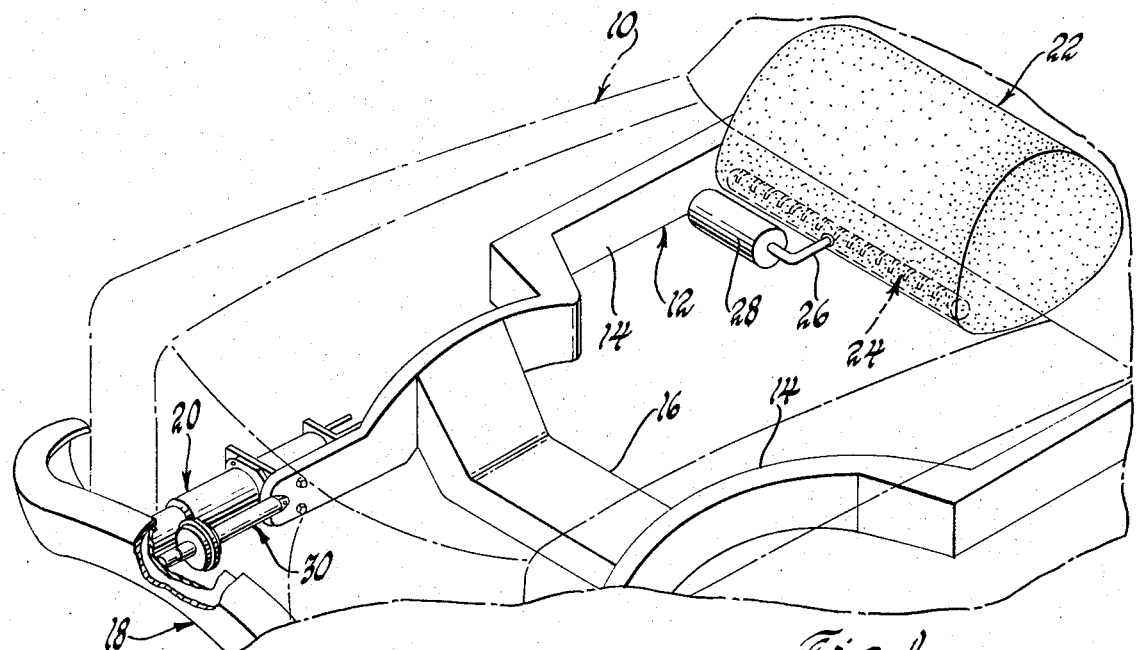
FIG. 1 is a partially broken away partial perspective view of a vehicle embodying an occupant restraint system according to this invention.
Figure 2:
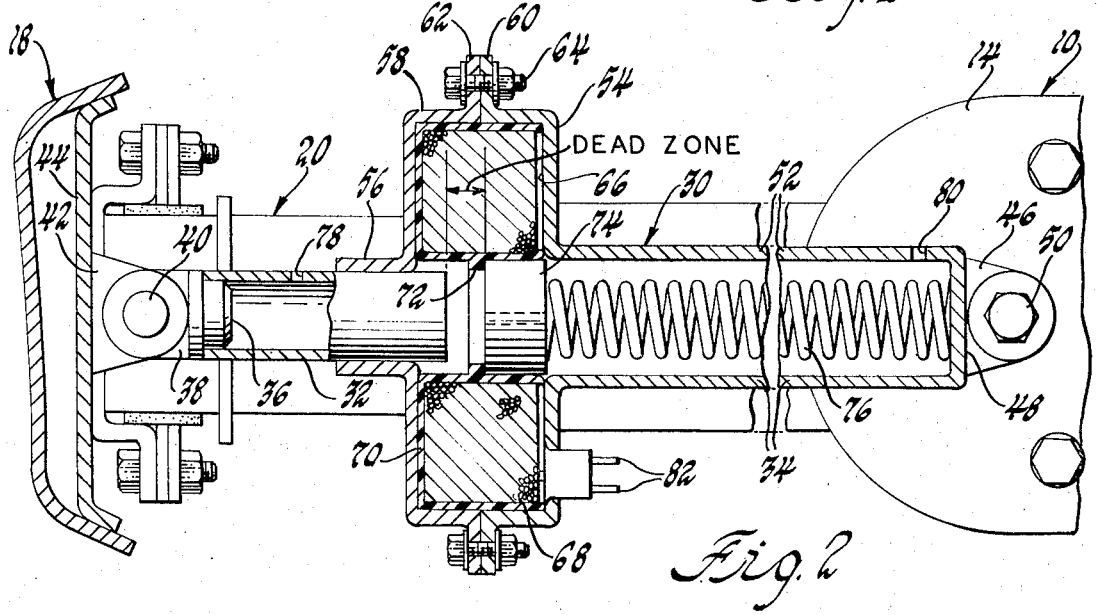
FIG. 2 is an enlarged sectional view of a portion of FIG. 1 showing the electromagnetic impact inducer.

Referring now particularly to FIG. 1 of the drawings, a vehicle designated generally 10 may either be of the integral body type or of the body frame type and includes a front frame or frame extension 12 comprising a pair of forwardly extending frame rails 14 which are conventionally interconnected adjacent their forward termini by a cross frame member 16. The frame or frame extension 12 is conventional and, accordingly, no further details thereof are shown or required for an understanding of this invention. A bumper or impact bar 18 extends across the front of the vehicle 10 and is supported thereon by a pair of like energy absorbing devices or struts 20, only one of which is shown. The struts 20 are connected between the impact bar and a respective rail 14 adjacent the forward terminus thereof. The details of the struts 20 form no part of this invention and, accordingly, are not shown. Reference may be had to copending application Ser. No. 124,282, Fischer et al., filed Mar. 15, 1971, now abandoned, for a detailed disclosure of such struts.

As shown in FIG. 1, an inflatable occupant restraint cushion 22 is mounted on the instrument panel of the vehicle and inflated from a diffuser 24. The diffuser 24 communicates by means of a manifold 26 with a pressure vessel 28 which provides a source of pressure fluid for inflating the cushion. Communication between the pressure vessel 28 and the manifold 26 is normally blocked by a diaphragm which is ruptured by electrically fired detonators. Alternatively, a gas generator may be used in place of the pressure vessel 28 or a combination of a pressure vessel and gas generator may be used, conventionally known as an air-augmented system. The gas generator or air-augmented systems are also actuated upon receipt of an electrical signal. Further details of the cushion 22 may be had by reference to Ser. No. 36,080, Klove et al., filed May 11, 1970, now U.S. Pat. No. 3,618,978, although such cushion as well as the inflating means for the cushion are well known in the art.

An electromagnetic impact transducer or sensor 30 is connected between the impact bar 18 and one of the frame rails 14 to provide a voltage output to an electronic switch for initiating inflation of the cushion 22 from the source 28 when the rate of movement of the impact bar 18 with respect to the frame rails 14 is indicative of the energy absorbing capability of the struts 20 being exceeded. The transducer 30 includes a pair of telescopically related cylindrical members 32 and 34. The one member 32 has its forward end receiving and secured to a shouldered plug 36 which includes an integral apertured ear 38. Ear 38 is secured at 40 to an ear 42 which extends rearwardly from the inner reinforcing plate 44 of the impact bar 18. The other member 34 includes an ear 46 which extends laterally to the rear closed wall 48 thereof and is bolted at 50 to the frame rail 14 adjacent the forward end thereof.

The member 34 includes a first cylindrical portion 52 which merges into an enlarged cylindrical portion 54, and a second cylindrical portion 56 which merges into an enlarged cylindrical portion 58 coterminus with the portion 54. Flanges 60 and 62 of portions 54 and 58 are bolted together at 64 to provide a cylindrical chamber 66. A coil and bobbin assembly 68 is located within the chamber 66 coaxial with members 32 and 34. The assembly 68 is conventional and includes a coil having a number of turns of wire received within a plastic spool 70. The inner axial flange of the spool includes an integral continuous radial rib 72. A permanent magnet 74 normally seats against the rib 72 under the action of a coil compression spring 76 seating against the magnet and the end wall 48 of the member 34. The member 32 is apertured at 78 and the member 34 apertured at 80 so that there is no pressure build-up within such members when they move relative to each other as will be explained. The magnet 74 is likewise axially apertured to avoid any pressure build-up in member 34. The inner end of the member 32 is piloted in portion 56 of member 34 and spaced as shown a predetermined distance from the magnet 74 to provide a so-called dead zone requiring that the member 32 move a predetermined distance relative to the member 34 under impact forces applied to the impact bar 18 before any engagement between the member 32 and the magnet can occur.

When the impact forces applied to the impact bar 18 are within the energy absorbing capability of the struts 20 and below a predetermined limit, the member 32 moves inwardly and outwardly of the member 34 and no output voltage is generated by the coil since no movement of the magnet 74 relative to the coil occurs. When the impact forces applied to the impact bar 18 exceed the energy absorbing capability of the struts 20, the member 32 will move inwardly of the member 34 a distance greater than the axial distance provided by the dead zone and the inner end of the member 32 will thereupon engage the permanent magnet 74 and move this magnet inwardly of the member 34 or to the right against the action of the spring 76. As the magnet moves relative to the coil, a voltage will be induced in the coil which is proportional to the rate of movement or velocity of the member 32 relative to the member 34 and indicative that the energy absorbing capability of the struts 20 will be exceeded so that vehicle deformation will occur. This voltage is measured across the outputs 82 of the coil assembly and provides a signal for initiating actuation of the cushion 22.

Figure 3:
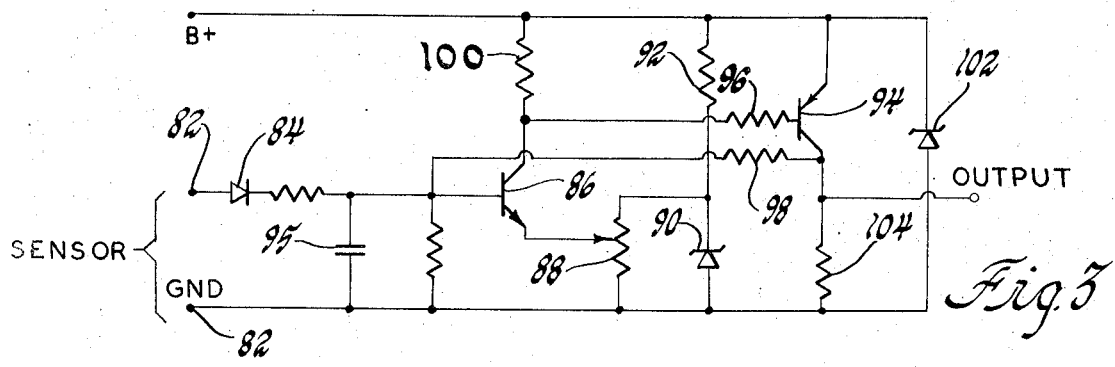
FIG. 3 is a schematic of the electronic latch circuit.

FIG. 3 is a schematic diagram of an electronic latch circuit triggered by the output of the coil assembly 68 and initiating firing of the detonators which seal the pressure vessel 28 from the manifold 26 to thereby initiate inflation of the cushion 22. As shown, the outputs 82 of the coil assembly are connected between ground and an input through a diode 84 which prevents any negative going voltage following impact from unlatching the circuit. The input voltage turns on the transistor 86 when it reaches a certain value. The voltage at which transistor 86 is turned on is set by the variable resistor 88. A zenar diode 90 and a load resistor 92 set the B+ voltage to the variable resistor 88. The transistor 86 turns on a second transistor 94 across resistor 96 and in turn, transistor 94 latches in transistor 86 across resistor 98. A resistor 100 controls the B+ voltage to the base of transistor 94 and a zenar diode 102 provides protection against transient B+ voltage. Capacitor 95 provides noise immunity for protecting the base of transistor 86. The output is across resistor 104 and may be connected directly to the detonators so as to fire the detonators. Likewise the output may be connected directly to the igniters of a gas generator, or directly to both the igniters and detonators of an air-augmented system.

Thus, this invention provides an improved occupant restraint system.

We claim:

1. In an automotive vehicle, the combination comprising, a source of pressure fluid, an inflatable cushion, communicating means actuatable to communicate the cushion with the source for inflation thereof, a bumper impact bar receptive of impact forces, means mounting the impact bar on the vehicle for movement relative thereto under impact forces, means absorbing the energy of impact forces applied to the bar within a predetermined limit, a pair of relatively movable telescopic members interconnected between the impact bar and the vehicle for movement relative to each other upon movement of the impact bar relative to the vehicle, an induction coil mounted on one of the members, a magnet slidably received within the coil, means positioning the magnet within the coil and locating the magnet a predetermined distance from the other member to permit telescopic movement of the members over such predetermined distance without movement of the magnet, telescopic movement of the members relative to each other over a distance exceeding such predetermined distance engaging the other member with the magnet to move the magnet relative to the coil and generate a voltage within the coil for initiating actuation of the communicating means.

2. In an automotive vehicle, the combination comprising, a source of pressure fluid, an inflatable cushion, communicating means actuatable to communicate the cushion with the source for inflation thereof, a bumper impact bar receptive of impact forces, means mounting the impact bar on the vehicle for movement relative thereto under impact forces, means absorbing the energy of impact forces applied to the bar within a predetermined limit, a pair of relatively movable telescopic members having respective ends thereof slidably interengaged, respective means connecting the other ends of the members respectively to the impact bar and to the vehicle for sliding movement of the members relative to each other upon movement of the impact bar relative to the vehicle, an induction coil mounted on one of the members adjacent the unconnected end thereof, a magnet slidably received within the coil, cooperating means on the coil and one member positioning the magnet within the coil and locating the magnet a predetermined distance from the unconnected end of the other member to permit telescopic movement of the members over such predetermined distance without movement of the magnet, telescopic movement of the members relative to each other over a distance exceeding such predetermined distance engaging the unconnected end of the other member with the magnet to move the magnet relative to the coil and generate a voltage within the coil for initiating actuation of the communicating means.

3. The combination recited in claim 2 wherein the cooperating means include a fixed stop on the coil and biasing means seating between the one member and the magnet seating the magnet against the fixed stop.

4. The combination recited in claim 2 wherein the coil is wound on an annular spool having a central bore coaxial with the axes of the telescopic members and defined by an annular wall, the cooperating means including a radial rib on the annular wall and a bias seated between the one member and the magnet to seat the magnet against such rib.

* * * * *